(12) United States Patent
Sugai et al.

(10) Patent No.: US 9,963,120 B2
(45) Date of Patent: May 8, 2018

(54) VEHICULAR WASHER NOZZLE DEVICE MOUNT STRUCTURE

(71) Applicant: HONDA MOTOR CO., LTD., Tokyo (JP)

(72) Inventors: Hidemasa Sugai, Wako (JP); Matsuo Iwama, Wako (JP); Tomohide Sawada, Wako (JP); Masahiko Higuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 14/902,146

(22) PCT Filed: Jul. 3, 2014

(86) PCT No.: PCT/JP2014/067755
§ 371 (c)(1),
(2) Date: Dec. 30, 2015

(87) PCT Pub. No.: WO2015/002260
PCT Pub. Date: Jan. 8, 2015

(65) Prior Publication Data
US 2016/0207503 A1    Jul. 21, 2016

(30) Foreign Application Priority Data

Jul. 4, 2013    (JP) ................................ 2013-140764

(51) Int. Cl.
*B60S 1/46*    (2006.01)
*B60S 1/52*    (2006.01)
(Continued)

(52) U.S. Cl.
CPC ................ *B60S 1/52* (2013.01); *B60R 13/04* (2013.01); *B62D 25/105* (2013.01)

(58) Field of Classification Search
CPC .......... B60S 1/52; B60R 13/04; B62D 25/105
(Continued)

(56) References Cited

U.S. PATENT DOCUMENTS

| 2,772,115 | A | * | 11/1956 | Stanley | ..................... | B60S 1/48 |
| | | | | | | 239/284.1 |
| 6,438,789 | B1 | * | 8/2002 | Murawa | ..................... | B60S 1/38 |
| | | | | | | 15/250.01 |

(Continued)

FOREIGN PATENT DOCUMENTS

| JP | S51-33428 | 3/1976 |
| JP | S56-1867 | 1/1981 |

(Continued)

OTHER PUBLICATIONS

International Search Report, dated Sep. 22, 2014 (dated Sep. 22, 2014).

*Primary Examiner* — Steven J Ganey
(74) *Attorney, Agent, or Firm* — Rankin, Hill & Clark LLP

(57) ABSTRACT

A washer nozzle device for spraying a washer fluid onto a front window panel is mounted to a vehicle body. The vehicle body includes a front hood disposed in front of the front window panel, and a hood garnish disposed on the front hood. The hood garnish is disposed over an upper surface of the front hood at an interval and extended along a rear end of the front hood in a vehicle width direction. The washer nozzle device is positioned between the upper surface of the front hood and a lower surface of the hood garnish.

19 Claims, 12 Drawing Sheets

(51) Int. Cl.
*B60R 13/04* (2006.01)
*B62D 25/10* (2006.01)

(58) Field of Classification Search
USPC .......... 239/284.1, 284.2; 15/250.01, 250.002
See application file for complete search history.

(56) References Cited

U.S. PATENT DOCUMENTS

2003/0066909 A1* 4/2003 Jenkins .................. B60S 1/528
239/284.1
2006/0108447 A1* 5/2006 Berger .................. B05B 15/069
239/284.1

FOREIGN PATENT DOCUMENTS

| JP | S62-17462 | 2/1987 | |
|----|-----------|--------|---|
| JP | 2006-240561 | 9/2006 | |
| JP | 2006240561 A * | 9/2006 | ................ B60S 1/52 |
| JP | 2008-155662 | 7/2008 | |

* cited by examiner

VEHICULAR WASHER NOZZLE DEVICE MOUNT STRUCTURE

TECHNICAL FIELD

The present invention relates to a technique in which a mounting structure for a washer nozzle device for injecting a washer fluid to a washer panel of a vehicle is improved.

BACKGROUND ART

Patent Literature 1 and Patent Literature 2 disclose a mounting structure for a vehicle washer nozzle device.

In the vehicle washer nozzle device mounting structure disclosed in Patent Literature 1, a washer nozzle device is mounted to a cowl top panel positioned between a lower edge of a front window panel and a rear edge of a front hood. However, various on-vehicle components are disposed on a lower side of the cowl top panel. The cowl top panel is attached/detached every time when maintenance inspections of the on-vehicle components are carried out. To improve operability of maintenance inspections of the on-vehicle components, the washer nozzle device is preferably mounted to a portion other than a cowl top panel.

Further, a facing wall facing to a panel surface of a front window panel is formed to the cowl top panel. A through-hole directing the panel surface is formed on the facing wall. A rear end of a washer nozzle device is inserted into the through-hole. The washer nozzle device incorporates a nozzle which injects a washer fluid. An opening penetrating a rear end of the nozzle is formed on a rear end surface of the washer nozzle device. A washer fluid injected from the nozzle is sprayed on a panel surface through the opening.

A rear surface of the facing wall is inclined backward. A rear end surface of the washer nozzle device is an inclined surface corresponding to the inclination of the rear surface of the facing wall. Generally, a shape of the rear surface of the facing wall is different for each vehicle type. For example, inclination in a vehicle width direction and inclination in a vertical direction on the rear surface are often different for each vehicle type. In the case where the inclination is changed, displacement on the rear end surface of the washer nozzle device with respect to the facing wall becomes noticeable. This interferes with improvement of an external appearance of a vehicle. Further, the washer nozzle device cannot be commonly used in vehicles of various types.

In a vehicle described in Patent Literature 2, a rear end of a front hood is positioned at an interval above a front end of a cowl top panel. Consequently, a space is formed between the rear end of the front hood and the front end of the cowl top panel. A nozzle in a washer nozzle device is disposed on the cowl top panel and behind the front hood and also mounted at the rear end of the front hood. Members other than the nozzle in the washer nozzle device, such as a washer fluid feeding hose, are disposed in the space. A hood garnish (cover) is provided on an upper surface of the rear end of the front hood. The hood garnish extends backward from a rear edge of the front hood and covers the nozzle from an upper side. The washer nozzle device is not mounted to the cowl top panel. Therefore, maintenance inspections of in-vehicle components disposed on a lower side of the cowl top panel can be easily carried out.

However, when a front hood is opened, a washer nozzle device is visible from outside. This interferes with improvement of an external appearance of a vehicle. Further, since a part of the washer nozzle device is disposed in the space, there is a limit to lower a whole height of the front hood to bring close to an upper side of the cowl top panel. Therefore, there is a room for improvement to expand driver's visibility for seeing a front side of a vehicle. Further, a nozzle is positioned behind a front hood, and therefore a hood garnish covering the nozzle becomes a large size.

Furthermore, in a vehicle washer nozzle device mounting structure described in Patent Literature 2, a facing wall facing to a panel surface of a front window panel s formed at a rear end of a hood garnish. A through-hole directing the panel surface is formed on the facing wall. A nozzle of a washer nozzle device is positioned on a front side of a vehicle body away from the facing wall. A washer fluid injected from the nozzle is sprayed on a panel surface through the through-hole. When a hood garnish is seen from outside, the nozzle is visible in the depth of the through-hole with respect to the hood garnish. This interferes with improvement of an external appearance of a vehicle.

PRIOR ART LITERATURE

Patent Literature

Patent Literature 1: JP 2008-155662 A
Patent Literature 2: JP 2006-240561 A

SUMMARY OF INVENTION

Technical Problem

An object of the present invention is to provide a technique which can improve an external appearance of a vehicle.

Solution to Problem

According to one aspect of the present invention, there is provided a vehicle washer nozzle device mounting structure. In the vehicle washer nozzle device mounting structure, a washer nozzle device for injecting a washer fluid to a front window panel is mounted to a vehicle body. The vehicle body includes a front hood positioned in front of the front window panel, and a hood garnish provided in the front hood. The hood garnish extends in a vehicle width direction along a rear end of the front hood at an interval above an upper surface of the front hood. The washer nozzle device is positioned between the upper surface of the front hood and a lower surface of the hood garnish.

Preferably, the hood garnish includes an upper wall extending along an upper surface of the front hood at the interval, and an abutting wall extending from the upper wall toward the upper surface of the front hood. A lower end of the abutting wall is directly abutted to the upper surface of the front hood or indirectly abutted to the upper surface of the front hood via a cushion member. A notch in which the lower end is cut out is formed at a part of the abutting wall in a vehicle width direction, and a part of the washer nozzle device is positioned at the notch.

Preferably, part of the vehicle washer nozzle device is formed at a small diameter portion in which a diameter is smaller than a height of the abutting wall, and the small diameter portion is positioned at the notch.

Preferably, the washer nozzle device includes a nozzle including an injection portion for injecting the washer fluid, a diameter of the nozzle is larger than a diameter of the small diameter portion, and the nozzle is positioned behind the abutting wall.

Preferably, the washer nozzle device includes a portion for mounting to the hood garnish, and the mounting portion is positioned forward of the abutting wall.

Preferably, the washer nozzle device includes a valve for controlling an injection amount of the washer fluid, which valve is positioned forwardly of the abutting wall.

Preferably, the hood garnish includes a rear wall extending downward from a rear end of the upper wall. The rear wall extends in a vehicle width direction along the rear end of the front hood and includes a through-hole penetrating in a longitudinal direction of a vehicle body. A rear end of the washer nozzle device is inserted into the through-hole. The rear end includes a shielding wall positioned between the abutting wall and the rear wall. The shielding wall is formed in a vertical plate shape along the rear wall. An outer diameter of the shielding wall is larger than a diameter of the through-hole.

Preferably, the rear wall of the hood garnish is positioned right behind the rear end of the front hood, and the shielding wall is positioned between the rear wall of the hood garnish and the rear end of the front hood.

Preferably, a washer fluid feeding hose connected to the washer nozzle device is further included, and the washer fluid feeding hose extends from one end in a vehicle width direction of the front hood to outside through a gap between the front hood and the hood garnish.

Preferably, right and left hinges for supporting both ends in a vehicle width direction of a rear end of the front hood are further included, and the washer fluid feeding hose extends from one end in a vehicle width direction of the front hood to outside along either one of the right and left hinges.

According to another aspect of the present invention, there is provided a vehicle washer nozzle device mounting structure wherein a washer nozzle device for injecting a washer fluid to a window panel is positioned on an inner side of an exterior member of a vehicle body and mounted to the vehicle body. The exterior member includes a facing wall facing to a panel surface of the window panel. A through-hole directing the panel surface is formed on the facing wall. The washer nozzle device includes a nozzle directing the panel surface. The nozzle includes an injection member, an injection member supporting member, and a cover. The injection member injects the washer fluid. The injection member supporting member supports an outer peripheral surface of the injection member such that an injection angle of the injection member can be adjusted. The cover extends toward the panel surface from the injection member supporting member. The cover has a tubular shape covering an injection portion of the injection member and inserted into the through-hole of the facing wall. A tip surface of the tubular cover is a flat surface substantially parallel to a rear surface of the facing wall and positioned behind the injection member, and at least a part of the tip surface is positioned in a range of a thickness of the facing wall.

Preferably, the cover covers a whole of an injection portion of the injection member, and an inner diameter of the cover is set larger than a movable range of the injection member.

Preferably, a movable range of the injection member is set to a range in which a moving locus of the injection portion becomes an arc shape, based on a movable center of the injection member with respect to the injection member supporting member. The cover is formed in a true cylindrical shape concentrical with the movable center of the injection member.

Preferably, the through-hole of the facing wall is concentrically formed with respect to a center of the cover.

Advantageous Effects of Invention

In the invention according to the one aspect, the front hood includes a hood garnish which extends in a vehicle width direction along a rear end of the front hood at an interval above an upper surface of the front hood. The washer nozzle device is positioned between an upper surface of the front hood and a lower surface of the hood garnish. Therefore, the washer nozzle device is not visible from outside when a front hood is opened. Therefore, the external appearance of the vehicle can be improved. Further, it is unnecessary to dispose the washer nozzle device under the front hood. Accordingly the whole height of the front hood can be lowered. For example, a cowl top panel is positioned under a rear portion of the front hood. By lowering a height of the front hood, the front hood can be brought close to an upper side of the cowl top panel. Since a whole height of the front hood is lowered, visibility in which a driver sitting on a driver's sheet can see a front side of a vehicle can be expanded, and an external appearance of the vehicle can be improved.

In the invention, the hood garnish includes an abutting wall extending from an upper wall of the hood garnish toward an upper surface of a front hood. The lower end of the abutting wall abuts on an upper surface of the front hood. Therefore, displacement (rattling) in a vertical direction of the hood garnish with respect to the front hood can be controlled. Further, a notch in which a lower end is cut out is formed on the abutting wall. A part of the washer nozzle device is positioned at the notch. Therefore, interference by the washer nozzle device with respect to the abutting wall can be prevented.

In the invention, a small diameter portion in the washer nozzle device is formed so as to be smaller than a height of the abutting wall and positioned at a notch. On the other hand, a height from an upper surface of a front hood to a lower surface of an upper wall of a hood garnish, specifically an interval of a gap is determined by a height of the abutting wall. The small diameter portion is smaller than the interval of the gap. Therefore, interference in the small diameter portion with respect to an upper surface of a front hood and an upper wall of a hood garnish can be more surely prevented.

In the invention, the diameter of the nozzle in the washer nozzle device is larger than a diameter of a small diameter portion positioned at a notch. Since an injection port is provided at a large diameter nozzle, an injection angle of the injection port can be more freely set. Especially, in the case where the injection angle of the injection port can be arbitrarily adjusted in a system, an angle adjustment mechanism can be provided at the nozzle. Further, the large diameter nozzle is positioned behind an abutting wall. Therefore, interference by the nozzle with respect to the abutting wall can be prevented.

In the invention, a mounting portion for mounting a washer nozzle device to a hood garnish is positioned forward of an abutting wall. Therefore, in comparison with a case where the mounting portion is disposed behind the abutting wall, a length from the abutting wall to a rear end of the hood garnish, specifically an extension length, can be shortened. Since the extension length is short, displacement in a vertical direction of the rear end of the hood garnish can be suppressed.

In the invention, the washer nozzle device includes a valve for controlling an injection amount of a washer fluid injected from an injection port. The valve is positioned forward of an abutting wall. Therefore, in comparison with a case where the valve is disposed behind the abutting wall, a length from the abutting wall to a rear end of the hood garnish, specifically an extension length, can be shortened. Since the extension length is short, displacement in a vertical direction of the rear end of the hood garnish can be suppressed.

In the invention, the rear end of the washer nozzle device is inserted into a through-hole disposed on a rear wall of the hood garnish. A substantially annular gap is included between the rear end of the washer nozzle device and the through-hole. The rear end of the washer nozzle device includes the shielding wall between the abutting wall and a rear wall. The shielding wall is formed in a vertical plate shape along the rear wall, and a diameter of the shielding wall is larger than a diameter of the through-hole. Therefore, the inside of the hood garnish is not visible from a rear side of the hood garnish through the gap. Therefore, the external appearance of the vehicle can be improved. Further, the rear side of the notch of the abutting wall is covered by the shielding wall. Therefore, it is prevented by the shielding wall that such as water and garbage intrude into a notch side from a rear side of the hood garnish through the gap.

In the invention, the rear wall of the hood garnish is positioned right behind the rear end of the front hood, and the shielding wall is positioned between the rear wall of the hood garnish and the rear end of the front hood. Therefore, regardless of a diameter of the shielding wall, interference by the shielding wall with respect to an upper surface of a front hood can be prevented. The washer nozzle device including the shielding wall can be brought close to the upper surface of the front hood. Accordingly, the hood garnish can be brought close to the upper surface of the front hood.

In the invention, preferably, the washer fluid feeding hose connected to the washer nozzle device extends from one end in a vehicle width direction of the front hood to outside through a gap between the front hood and the hood garnish. Therefore, it is not necessary to open a hole for passing through the hose on the front hood. Rigidity of the front hood can be secured. Further, since the front hood does not include the hole, intrusion of such as water and garbage into a space closed by the front hood (such as an engine room) can be easily prevented.

In the invention, the washer fluid feeding hose extends from one end in a vehicle width direction of the front hood to outside along the hinge for supporting the front hood. Therefore, in the hose, a portion extending to outside through the gap between the front hood and the hood garnish can be covered by the hinge. The hose is not easily visible from outside, and therefore the external appearance of the vehicle can be improved.

In the invention according to another aspect, the exterior member of the vehicle body includes the facing wall facing to the panel surface of the window panel. The through-hole directing the panel surface is formed on the facing wall. The nozzle of the washer nozzle device directs the panel surface and includes the cover extending from the injection member supporting member for supporting the injection member. The cover covers the injection portion of the injection member, and therefore the cover may have a thin-walled tubular shape and is inserted into the through-hole on the facing wall. Tip surface of the tubular cover is a flat surface substantially parallel to the rear surface of the facing wall and positioned behind the injection member. Further, at least, a part of the tip surface is positioned in a range of a thickness of the facing wall. Therefore, when the exterior member is seen from outside, the tip surface of the cover can be visually integrated with the exterior member. Consequently, the exterior member and the cover can have a sense of unity. Further, the cover is a tubular portion. Therefore, even if inclination in a vehicle width direction and a vertical direction of the facing wall of an exterior member is different for each vehicle type, displacement of the tip surface with respect to the facing wall is not so noticeable. Accordingly, while improving the external appearance of the vehicle, the washer nozzle device can be commonly used in vehicles of various types. Accordingly, the cost of manufacture of a vehicle can be reduced.

In the invention, the cover covers the whole injection portion of the injection member, and therefore the injection portion can be protected from outside. Further, the inner diameter of the cover is set larger than a movable range of the injection member. Therefore, the cover does not interfere with the injection member positioned in the movable range.

In the invention, the injection member supporting member can support the injection member such that the injection member can be tilted in all directions around a movable center. Therefore, the locus (moving locus) of the injection portion of the injection member becomes an arc-shaped surface (spherical surface) based on the movable center. On the other hand, the cover is formed in a true cylindrical shape concentrical with the movable center of the injection member. Therefore, the cover and the injection member can be brought close at the maximum without providing an unnecessary region therebetween.

In the invention, the through-hole of the facing wall is concentrically formed with respect to a center of the cover. The substantially annular gap is included between the through-hole and the cover. The gap can be uniformed over the whole periphery. Further, even if the mounting angle of the nozzle with respect to the exterior member is different for each vehicle type, the gap can be generally constant. Accordingly, the appearance around the through-hole can be improved.

DESCRIPTION OF EMBODIMENTS

An embodiment of the present invention will be described with reference to accompanying drawings.

Embodiment

A vehicle washer nozzle device mounting structure according to an embodiment will be described with reference to drawings.

Figure 1:
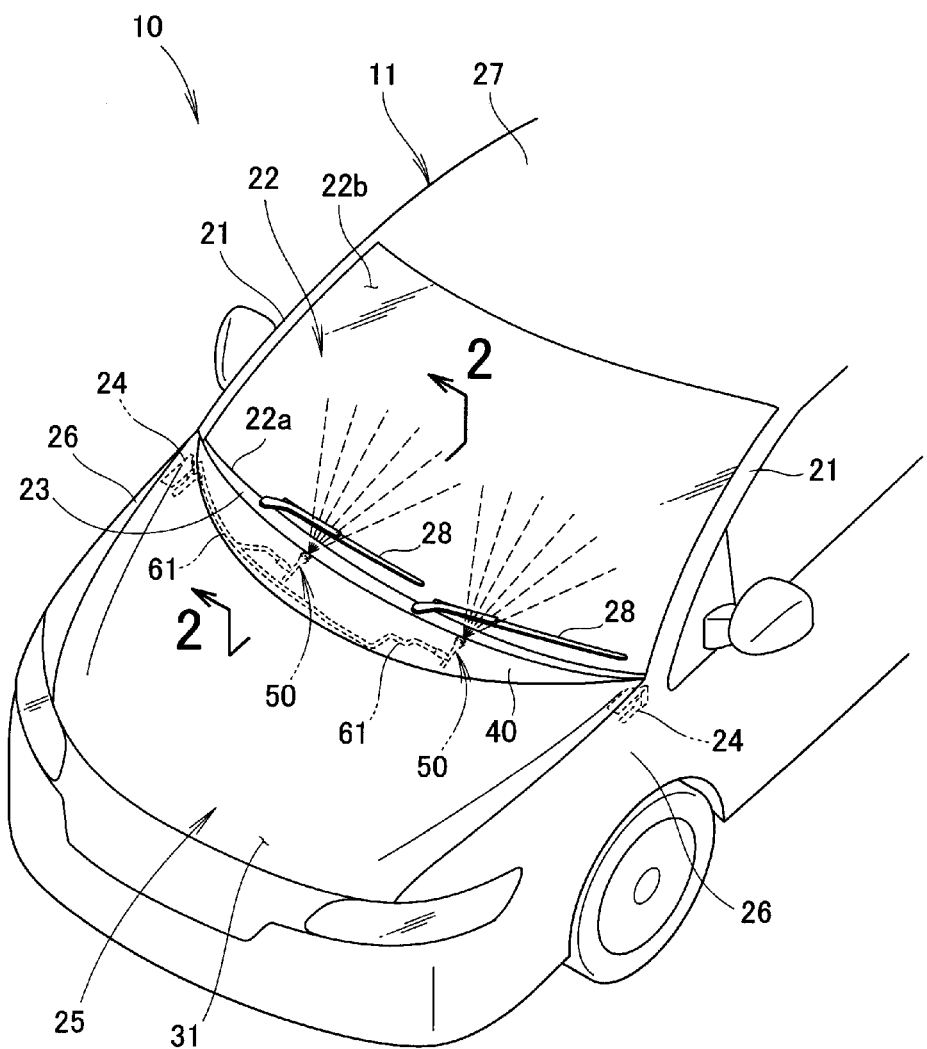
FIG. 1 is a perspective view of a front portion of a vehicle including a washer nozzle device according to the present invention.
Figure 2:
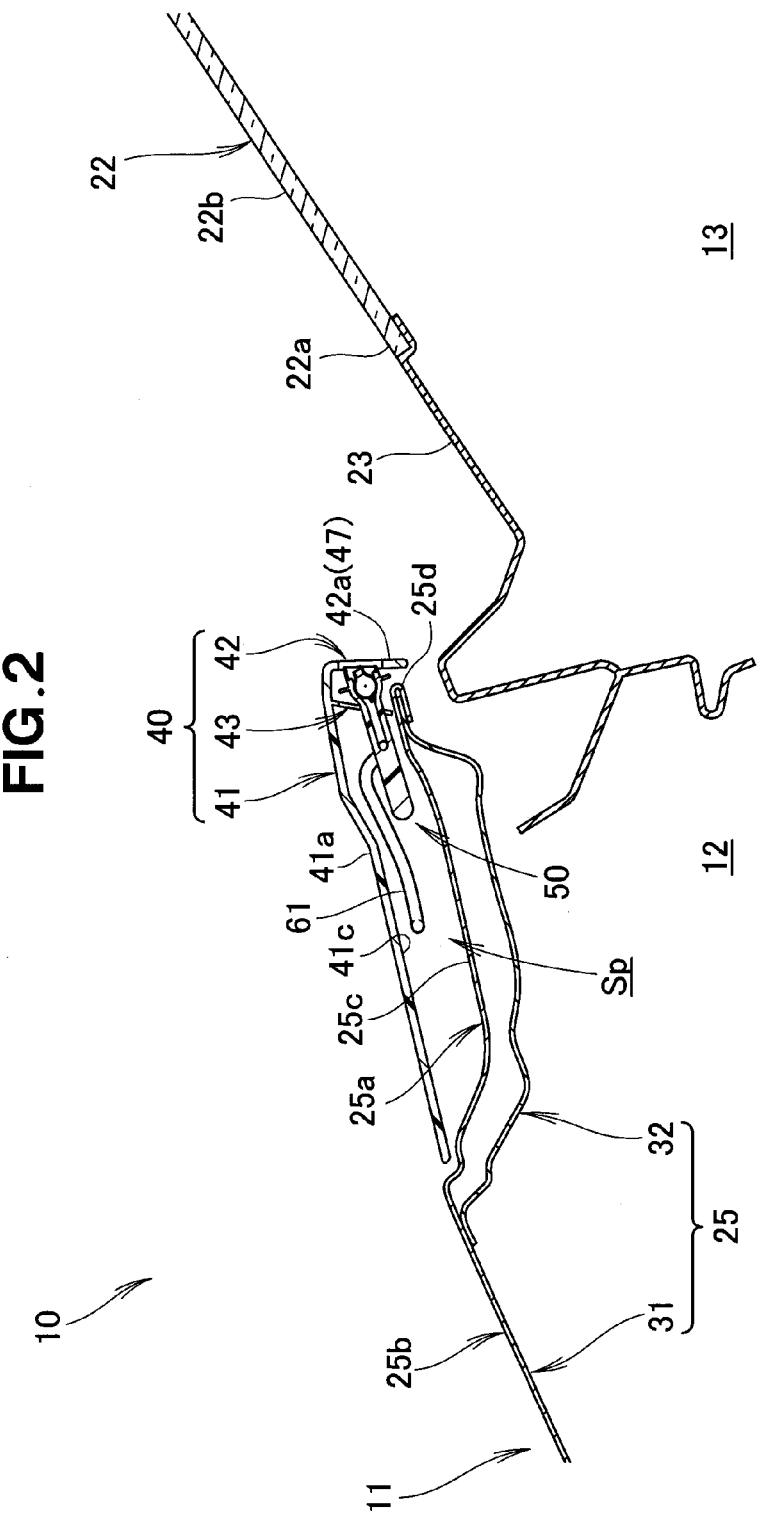
FIG. 2 is a sectional view taken along line 2-2 of FIG. 1.

As illustrated in FIGS. 1 and 2, a vehicle 10 is, for example, a passenger vehicle. A front chamber 12 and a back chamber 13 positioned just behind the front chamber 12 are formed on an inner side of a vehicle body 11. The vehicle body 11 is a monocock body. The front chamber 12 is included in a power unit storage chamber for storing a power unit such as an engine (not illustrated). The back chamber 13 is included in a cabin.

A front portion of the vehicle body 11 includes right and left front pillars 21 and 21, a window panel 22, a cowl top panel 23, and a front hood 25. The window panel 22 is provided between the right and left front pillars 21 and 21. The cowl top panel 23 is positioned in front of the window panel 22 and extends in a vehicle width direction along a lower edge 22a of the window panel 22. The front hood 25 is positioned in front of the cowl top panel 23, and a rear end thereof is supported by right and left hinges 24 and 24 so as to vertically open and close.

The right and left front pillars 21 and 21 extend upward from right and left front side outer panels 26 and 26 to a roof 27. The window panel 22 is called a window screen 22, a front window panel 22, or a front glass 22. A driving mechanism of wiper devices 28 and 28 is disposed on a lower side of the cowl top panel 23.

Figure 3:
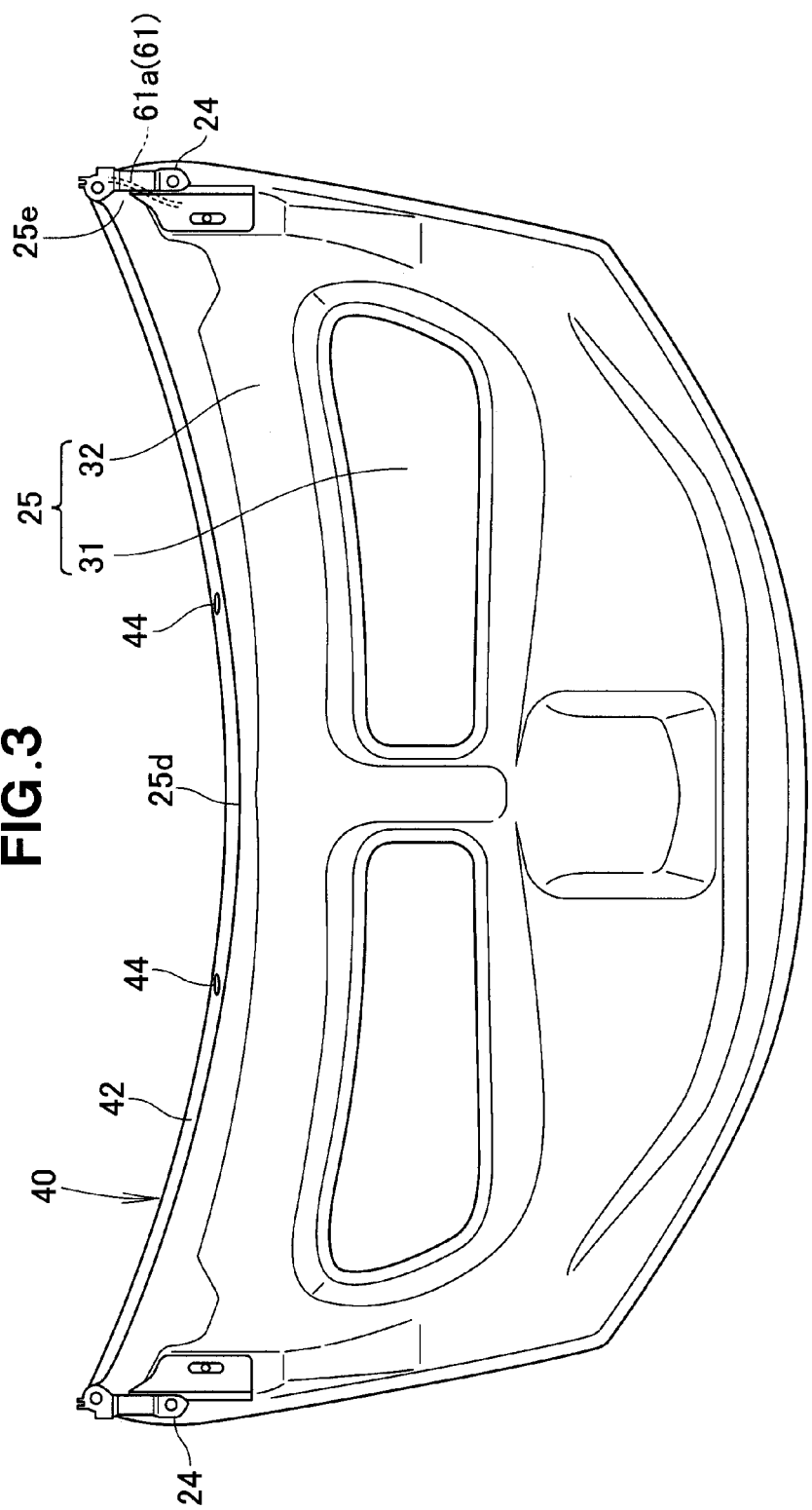
FIG. 3 is a bottom view illustrating the front hood of FIG. 1.

As illustrated in FIGS. 1 to 3, the front hood 25 is a member which is positioned in front of the window panel 22 and can be open and close an upper opening of the front chamber 12. The front hood 25 includes a hood body 31 and a reinforcing member 32. The hood body 31 is an external surface material. The reinforcing member 32 is provided on a back surface of the hood body 31. Both ends in a vehicle width direction of a rear end of the front hood 25 are supported by the vehicle body 11 by the right and left hinges 24 and 24. A front end of the front hood 25 is a tip in an opening/closing direction.

The front hood 25 includes an exterior member 40 on a rear end of the hood body 31. The exterior member 40 is a member for forming an exterior of the vehicle body 11. In the present embodiment, the exterior member 40 is provided on an outer surface of the hood body 31 of the front hood 25. Specifically, the exterior member 40 extends in a vehicle width direction along a rear end of the front hood 25 at an interval above an upper surface of the front hood 25. Hereinafter, the exterior member 40 is appropriately called "a hood garnish 40".

More specifically, as illustrated in FIG. 2, a latter half portion 25a of the front hood 25 is formed in a step shape and is one step lower than a front half portion 25b of the front hood 25. An upper side of the latter half portion 25a is covered by the hood garnish 40 made of resin. The hood garnish 40 is, for example, detachably mounted to the front hood 25. An upper surface of the hood garnish 40 (an upper surface 41a of an upper wall 41) is generally flush with an upper surface of the front half portion 25b of the front hood 25.

Figure 4:
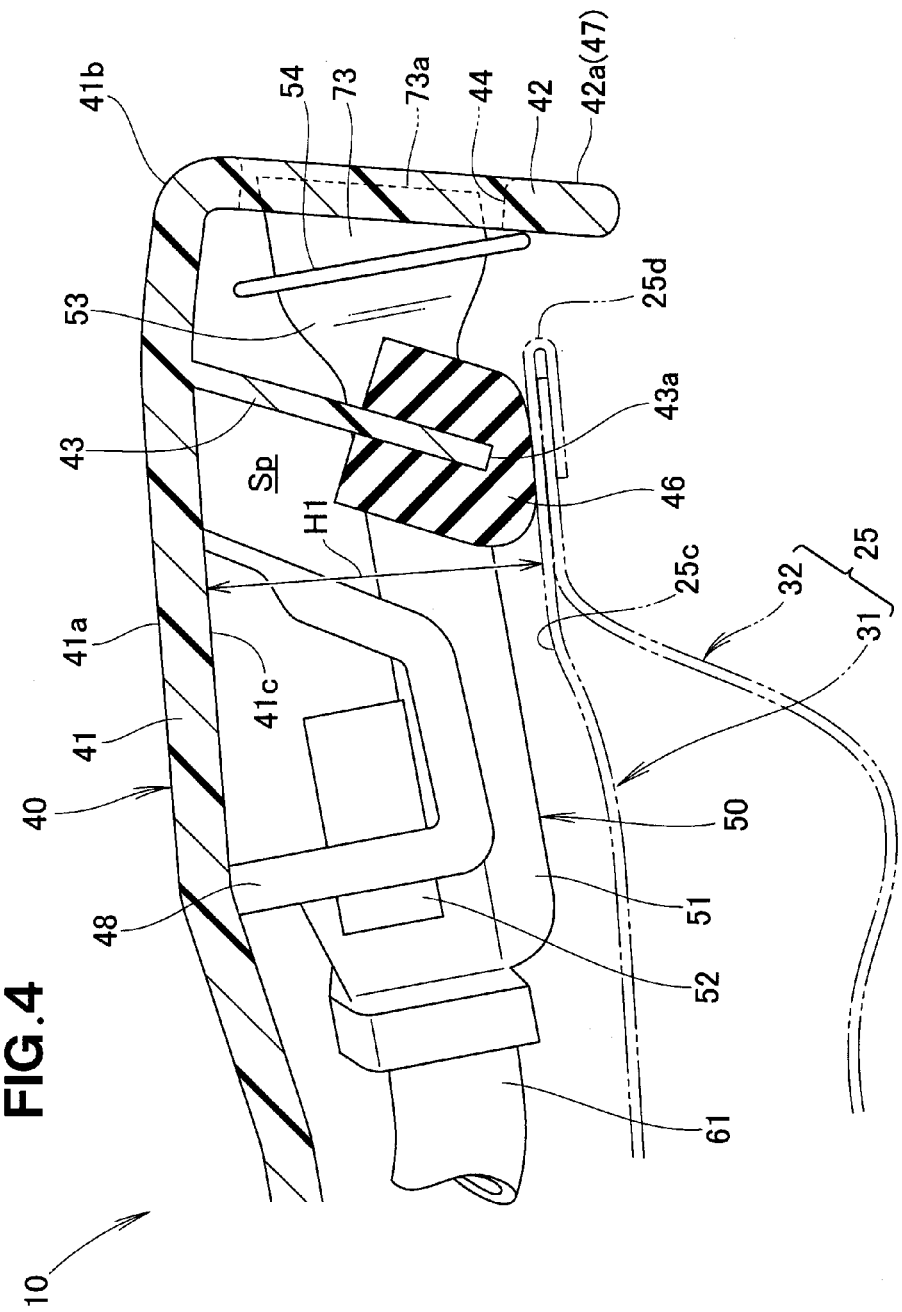
FIG. 4 is a sectional view illustrating a relation between the front hood and a hood garnish of FIG. 2.

As illustrated in FIGS. 2 and 4, the hood garnish 40 includes the upper wall 41, a rear wall 42, and an abutting wall 43 and is integrally molded. The upper wall 41 extends along an upper surface 25c (upper surface 25c of the latter half portion 25a) of the front hood 25 at a predetermined interval H1 (height H1). The rear wall 42 and the abutting wall 43 substantially vertically extend downward from the upper wall 41. A space Sp is formed between the upper surface 25c of the front hood 25 and a lower surface 41c of the upper wall 41. The upper surface 41a of the upper wall 41 extends along an extension line of an outline of the front half portion 25b of the front hood 25. The rear wall 42 and the abutting wall 43 are formed in a vertical plate shape in which a plate surface directs in a longitudinal direction of a vehicle, and extends in a vehicle width direction along a rear end 25d of the front hood 25.

The rear wall 42 extends downward toward right behind the rear end 25d of the front hood 25 from a rear end 41b of the upper wall 41. Specifically, the rear wall 42 is positioned right behind the rear end 25d of the front hood 25, extends in a vehicle width direction along the rear end 25d of the front hood 25, and also faces to a panel surface 22b (an outer surface 22b, a glass surface 22b) of the window panel 22. Hereinafter, the rear wall 42 is appropriately called "a facing wall 42". Two through-holes 44 and 44 directing the panel surface 22b are formed on the rear wall 42. The two through-holes 44 and 44 penetrate in a longitudinal direction of a vehicle body.

Figure 5:
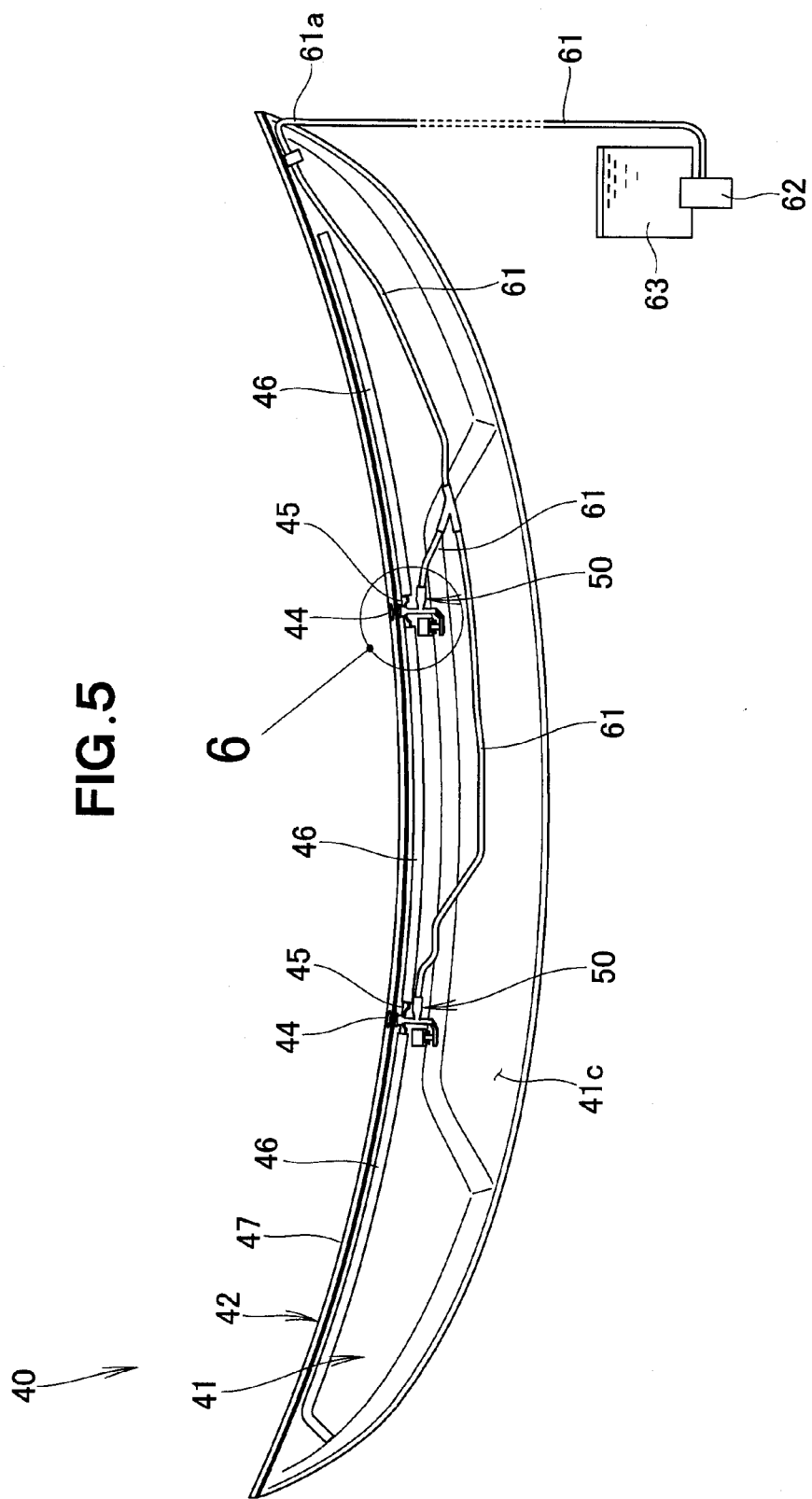
FIG. 5 is a bottom view illustrating the hood garnish of FIG. 1.
Figure 6:
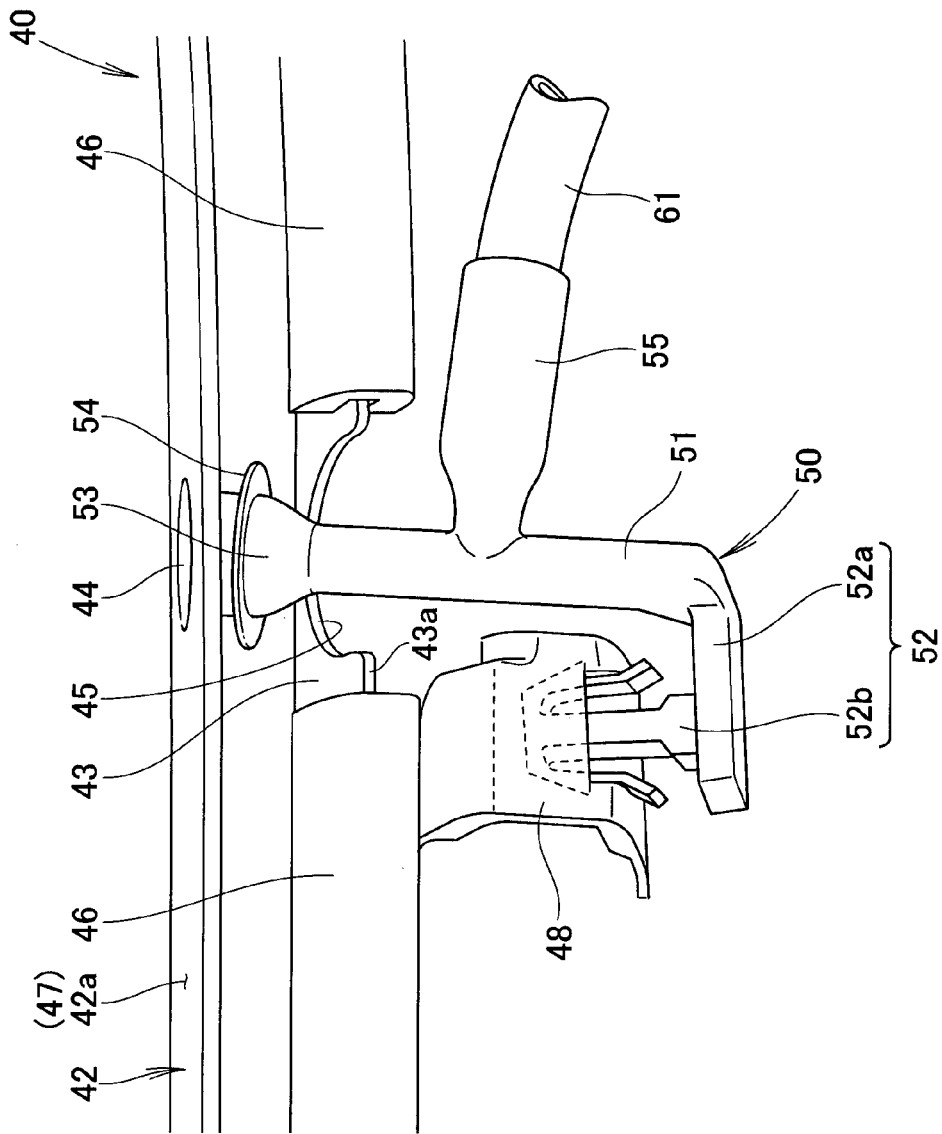
FIG. 6 is an enlarged view illustrating a portion 6 of FIG. 5.

As illustrated in FIGS. 4 to 6, the abutting wall 43 is positioned forward of the rear wall 42 and extends toward the upper surface 25c of the front hood 25 from the upper wall 41. Specifically, the abutting wall 43 extends downward toward a rear edge of the front hood 25 from the upper wall 41. Two notches 45 and 45 in which a lower end 43a is cut out are formed in a part in a vehicle width direction of the abutting wall 43. The two notches 45 and 45 are positioned corresponding in a longitudinal direction of a vehicle body with respect to each of the through-holes 44 and 44 on the rear wall 42.

The lower end 43a of the abutting wall 43 indirectly abuts on the upper surface 25c of the front hood 25 via a cushion member 46 and directly abuts thereon without the cushion member 46. The cushion member 46 is a member which includes a flexible material and has a U-shaped cross section. The cushion member 46 is substantially provided over between both ends in a vehicle width direction of the front hood 25. Specifically, the cushion member 46 is not provided at a portion of the two notches 45 and 45. The cushion member 46 is inserted from a lower side into the abutting wall 43.

As illustrated in FIGS. 1 and 2, the vehicle 10 includes at least one washer nozzle device 50. In the present embodiment, the vehicle 10 includes two washer nozzle devices 50 and 50. Each of the washer nozzle devices 50 and 50 is a device for injecting a washer fluid to the window panel 22. The washer nozzle devices 50 and 50 are positioned on an inner side of the hood garnish 40 and mounted to the vehicle body 11. More specifically, each of the washer nozzle devices 50 and 50 is positioned between the upper surface 25c of the front hood 25 and the lower surface 41c of the upper wall 41, in other words, in the space Sp.

As illustrated in FIGS. 1, 2, and 5, washer fluid feeding hoses 61 and 61 are connected to the washer nozzle device 50 and 50, respectively. The washer fluid feeding hoses 61 and 61 which are bundled into one or are not bundled extend from one end 25e in a vehicle width direction of the front hood 25 (see FIG. 3) to outside through a gap Cr (see FIG. 7) between the front hood 25 and the hood garnish 40. Specifically, the washer fluid feeding hose 61 extends from the one end 25e in a vehicle width direction of the front hood 25 to outside along either one of the right and left hinges 24 and 24 and is connected to a washer fluid tank 63 via a pump 62.

Therefore, it is unnecessary to open a hole for passing through the hose 61 on the front hood 25. Rigidity of the front hood 25 can be secured. Further, since the front hood 25 does not include the hole, as illustrated in FIG. 2, intrusion of such as water and garbage into a space 12 (a front chamber 12) closed by the front hood 25 can be easily prevented.

Figure 7:
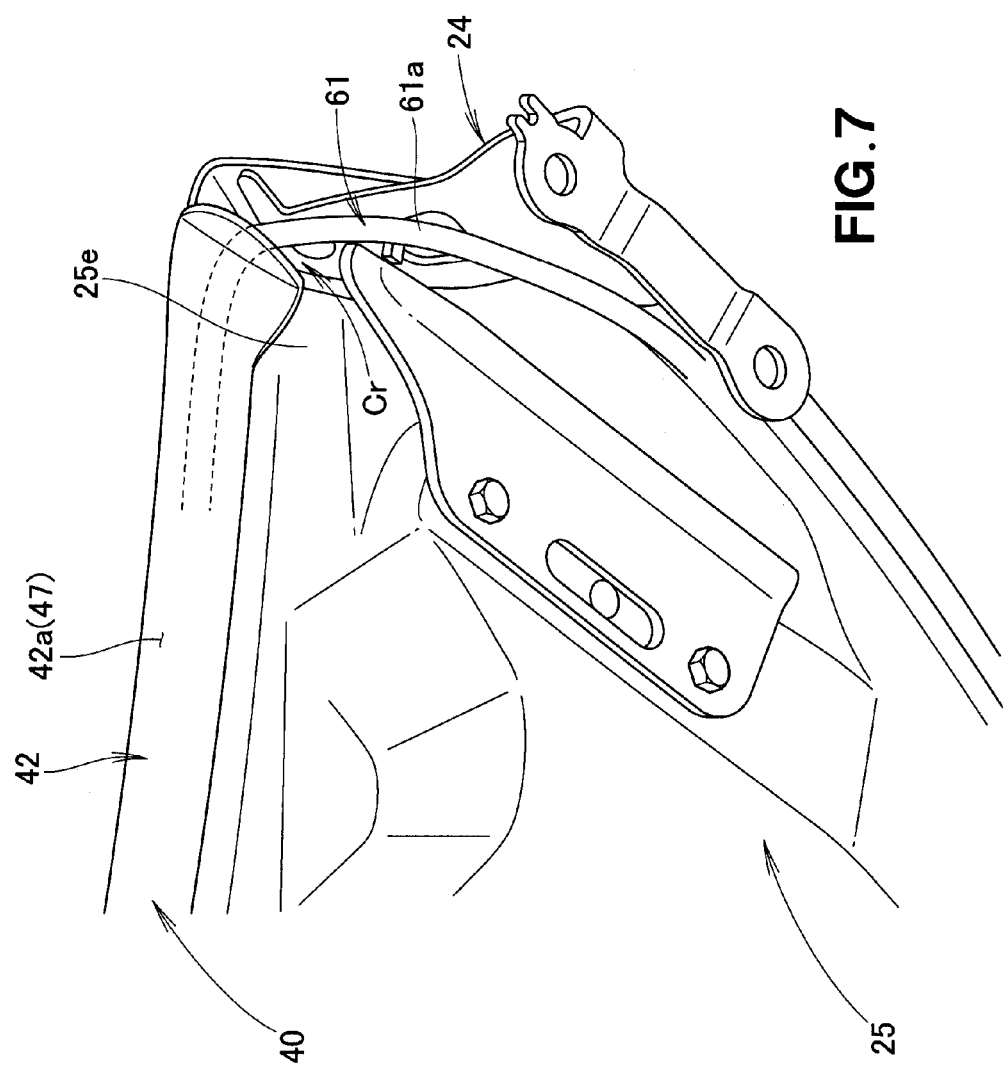
FIG. 7 is a perspective view illustrating a relation between a right side end of the front hood and a right hinge of FIG. 3.

When referring to FIG. 7, as described above, the washer fluid feeding hose 61 extends from the one end 25e in a vehicle width direction of the front hood 25 to outside along the hinge 24 for supporting the front hood. Therefore, in the hose 61, a portion 61a extending to outside through a gap Cr between the front hood 25 and the hood garnish 40 can be covered by the hinge 24. The hose 61 is not easily visible from outside, and therefore an external appearance of the vehicle 10 can be improved.

Figure 8:
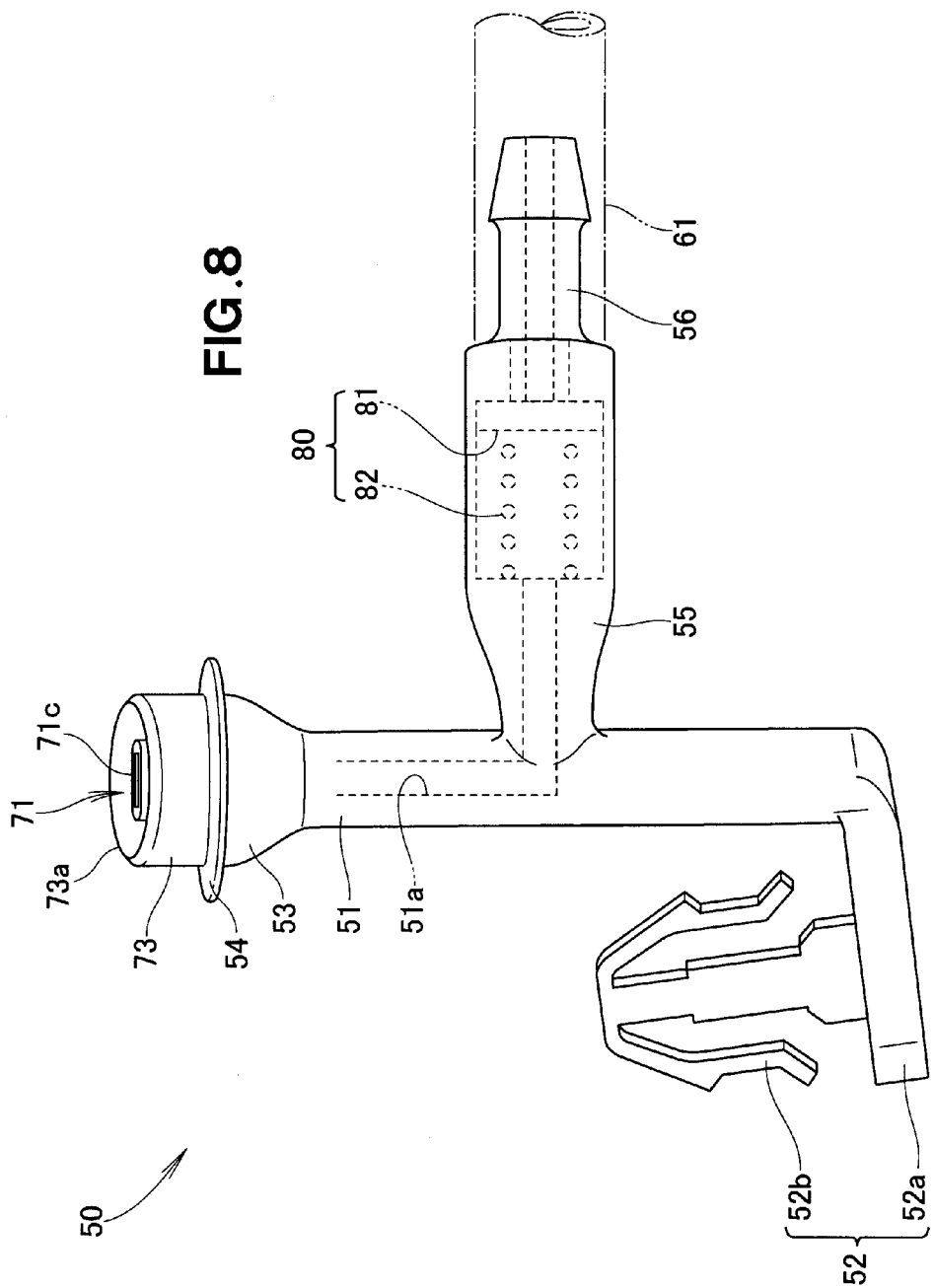
FIG. 8 is an enlarged view illustrating the washer nozzle device of FIG. 6.
Figure 9:
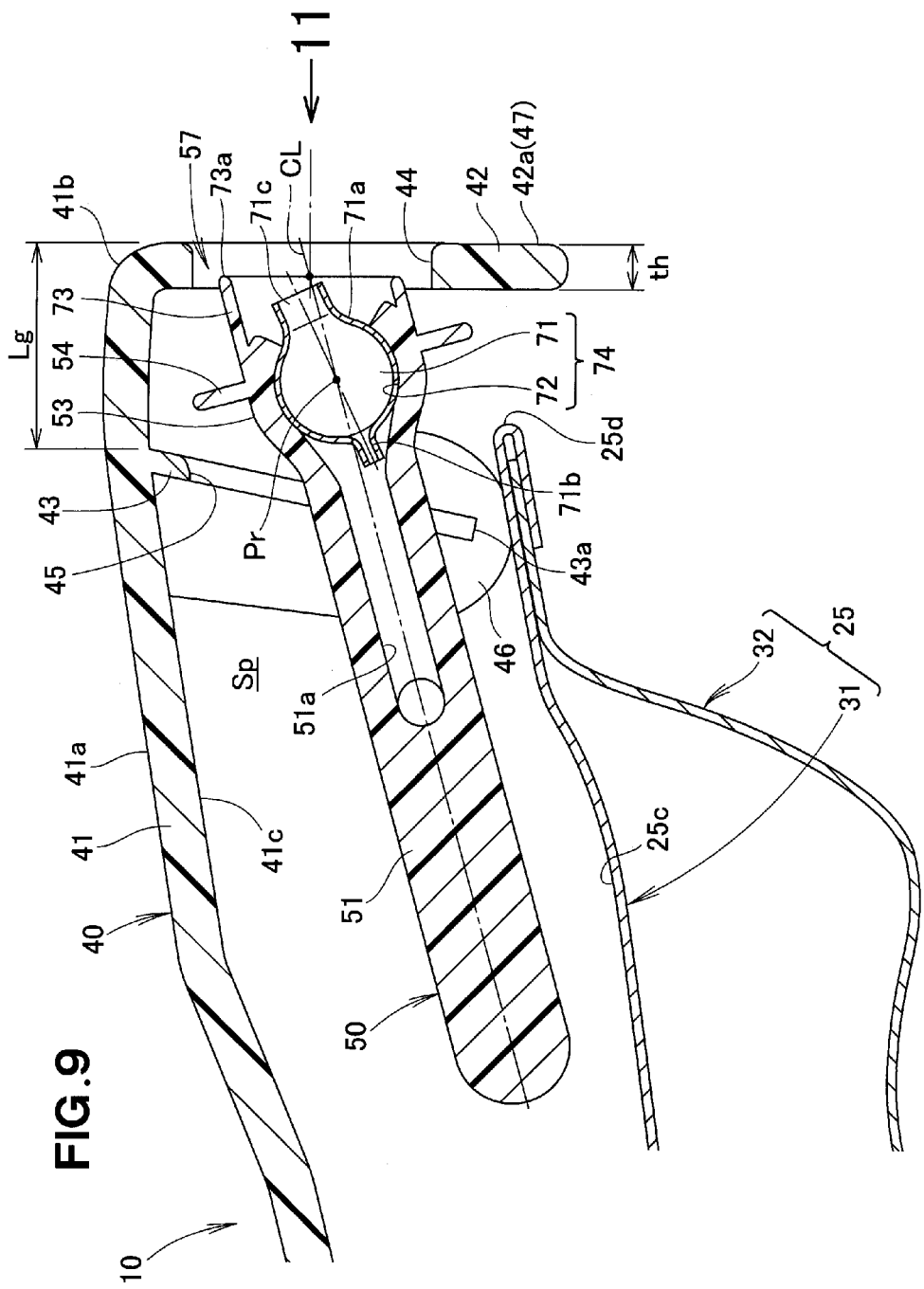
FIG. 9 is an enlarged view illustrating the front hood, the hood garnish, and the washer nozzle device of FIG. 2.

One washer nozzle device 50 will be described below in detail. As illustrated in FIGS. 6, 8, and 9, the washer nozzle device 50 is a resin molding including a base 51, a mounting portion 52, a nozzle 53, a shielding wall 54, a branching portion 55, and a hose connecting portion 56. The base 51 has a substantially column shape. The mounting portion 52 is integrally formed with a front end (end on a vehicle front side) of the base 51. The nozzle 53 is integrally formed with a rear end (end on a vehicle rear side) of the base 51. The shielding wall 54 is integrally formed with the nozzle 53. The branching portion 55 is branched on a side in the middle in a longitudinal direction of the base 51. The hose connecting portion 56 is integrally formed with a tip of the branching portion 55.

The base 51 is a long and narrow portion in a vehicle longitudinal direction and is a part of the washer nozzle device 50 of which diameter is formed smaller than a height H2 (see FIG. 10) of the abutting wall 43. A fluid passage 51a is formed in the base 51. Hereinafter, the base 51 is appropriately called "small diameter portion 51" or "a part 51 of the washer nozzle device 50".

The part 51 of the washer nozzle device 50, in other words, the small diameter portion 51, is positioned at the notch 45 on the abutting wall 43. On the other hand, as described above, a height H1 from the upper surface 25c of the front hood 25 to the lower surface 41c of the upper wall 41, in other words, the interval H1 of a space Sp (gap Sp) is determined by the height H2 of the abutting wall 43. The small diameter portion 51 is smaller than the interval H1 of the gap Sp. Therefore, interference in the small diameter portion 51 to the upper surface 25c of the front hood 25 and the upper wall 41 can be more surely prevented.

The mounting portion 52 is a portion for mounting to the hood garnish 40 and positioned forward (a front side of a vehicle) of the abutting wall 43. Therefore, in comparison with a case where the mounting portion 52 is disposed behind the abutting wall 43, a length Lg (see FIG. 9) from the abutting wall 43 to a rear end 47 of the hood garnish 40, in other words, an extension length Lg, can be shortened. Since the extension length Lg is short, displacement in a vertical direction of the rear end 47 of the hood garnish 40 can be suppressed.

More specifically, the mounting portion 52 includes an arm 52a and a leg 52b. The arm 52a extends to one side in a vehicle width direction from a front end of the base 51. The leg 52b extends from the arm 52a to a vehicle rear side. The leg 52b is mounted detachably by a snap fit to a holding portion 48 formed on an inner surface of the upper wall 41.

Figure 10:
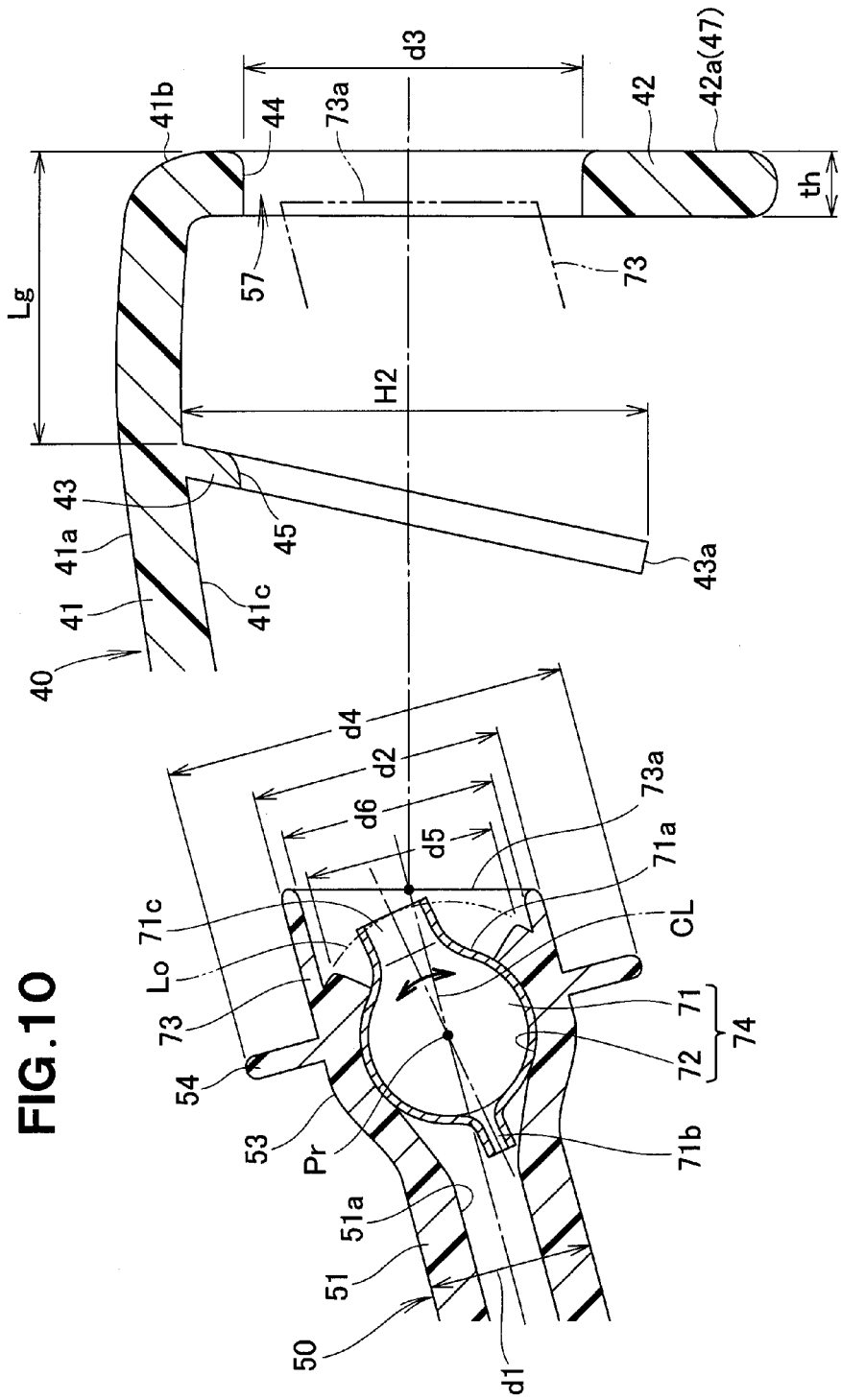
FIG. 10 is an exploded view illustrating the hood garnish and the washer nozzle device of FIG. 9.

The nozzle 53 directs the panel surface 22b (see FIG. 2) of the window panel 22 and includes an injection port 71c for injecting a washer fluid as illustrated in FIGS. 9 and 10. A diameter d2 of the nozzle 53 is larger than a diameter d1 of the small diameter portion 51 and positioned behind the abutting wall 43, specifically between the abutting wall 43 and the rear wall 42. A diameter d3 of the through-hole 44 on the rear wall 42 is larger than the diameter d2 of the nozzle 53 (the diameter d2 of the rear end 53 of the washer nozzle device 50). The nozzle 53 (the rear end 53) is inserted into the through-hole 44.

A substantially annular gap 57 is included between the rear end 53 and the through-hole 44.

Further, the nozzle 53 includes the shielding wall 54 positioned between the rear wall 42 and the abutting wall 43. The shielding wall 54 is formed in a vertical plate shape along the rear wall 42. An outer diameter d4 of the shielding wall 54 is larger than the diameter d3 of the through-hole 44.

Therefore, the inside of the hood garnish 40 is not visible from a rear side of the hood garnish 40 (the window panel 22 side illustrated in FIG. 2) through the gap 57. Therefore, an external appearance of the vehicle 10 can be improved. Further, a rear side of the notch 45 of the abutting wall 43 is covered by the shielding wall 54 positioned on a rear side of the abutting wall 43. Therefore, it is prevented by the shielding wall 54 that such as water and garbage intrude into the notch 45 side from a rear side of the hood garnish 40 through the gap 57.

Further, as described above, the rear wall 42 of the hood garnish 40 is positioned right behind the rear end 25d of the front hood 25. The shielding wall 54 is positioned between the rear end 25d of the front hood 25 and the rear wall 42. Specifically, as illustrated in FIG. 9, at least a lower half portion of the shielding wall 54 is disposed at a portion which does not overlap with the rear end 25d in a vertical direction of the vehicle 10. Therefore, regardless of a diameter of the shielding wall 54, interference by the shielding wall 54 with respect to the upper surface 25c of the front hood 25 can be prevented. The washer nozzle device 50 including the shielding wall 54 can be brought close to the upper surface 25c of the front hood 25. Accordingly, the hood garnish 40 can be brought close to the upper surface 25c of the front hood 25.

As illustrated in FIG. 9, the nozzle 53 includes an injection member 71, an injection member supporting member 72, and a cover 73. The injection member 71 injects a washer fluid. The injection member supporting member 72 supports an outer peripheral surface 71a of the injection member 71 such that an injection angle of the injection member 71 can be adjusted. The cover 73 extends from the injection member supporting member 72 to the panel surface 22b of the window panel 22 (see FIG. 2).

Figure 11:
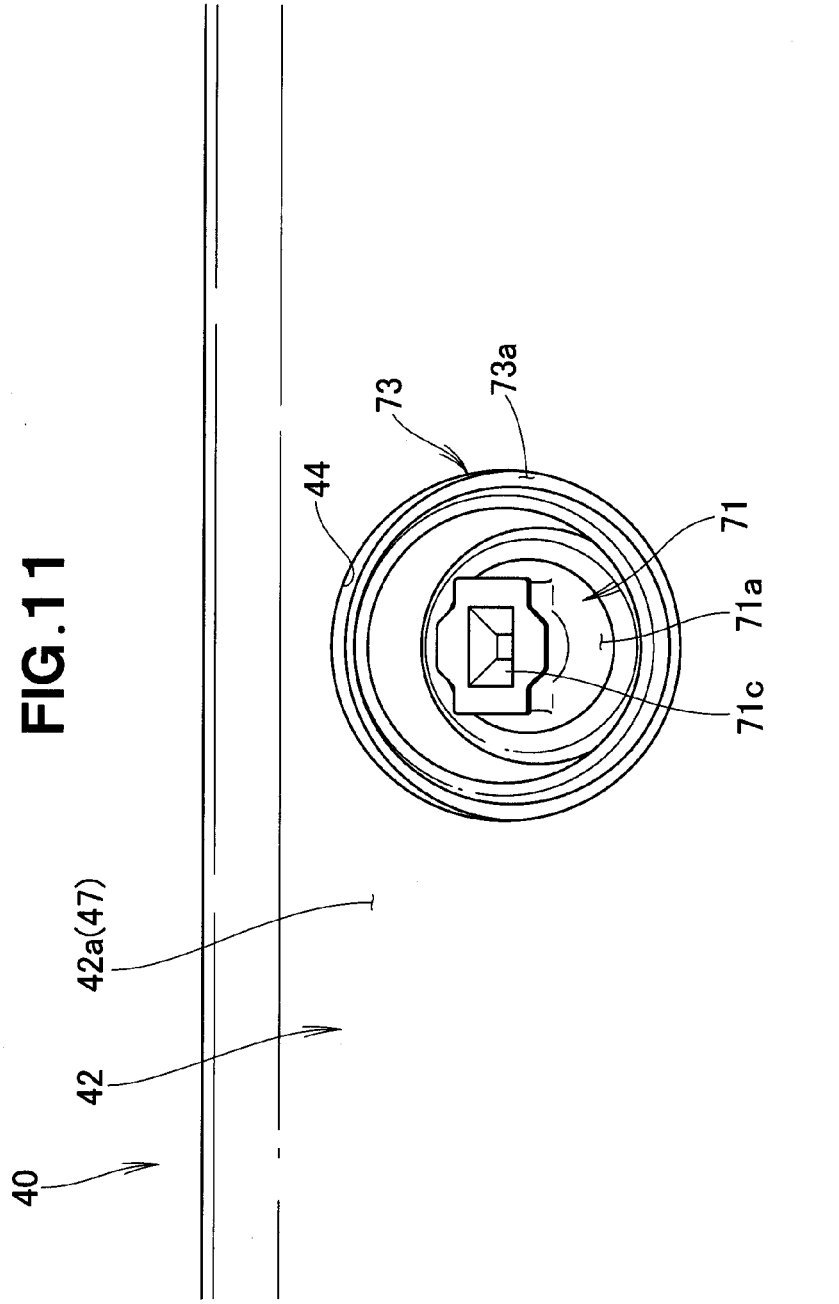
FIG. 11 is a view taken in the direction of arrow 11 of FIG. 9.

As illustrated in FIGS. 9 to 11, the injection member 71 has a hollow spherical shape and includes a fluid inlet 71b at a front end and an injection port 71c at a rear end. The fluid inlet 71b communicates with the fluid passage 51a of the base 51. The injection port 71c is an injection portion extending toward the panel surface 22b (see FIG. 2) of the window panel 22. Hereinafter, the injection port 71c is appropriately called "an injection portion 71c". As described above, the injection member supporting member 72 can support the injection member 71 such that the injection member 71 can be tilted in all directions around a movable center Pr. Therefore, a locus Lo (moving locus Lo) of the injection port 71c of the injection member 71 becomes an arc-shaped surface (spherical surface) based on the movable center Pr. A movable range d5 of the injection member 71 is set in a range in which the moving locus Lo of the injection port 71c has an arc shape (arc-shaped surface, spherical surface) based on the movable center Pr of the injection member 71 with respect to the injection member supporting member 72. The movable range d5 of the injection member 71, in other words, a swinging range d5 of the injection port 71c, is a range until the injection port 71c hits on an edge of the injection member supporting member 72.

The washer nozzle device 50 according to the present embodiment uses a system in which an injection angle of the injection port 71c can be arbitrarily adjusted. Specifically, a combination structure of the injection member 71 and the injection member supporting member 72 forms an angle adjustment mechanism 74. The injection member supporting member 72 supports the injection member 71 by a friction force adjustable to an arbitral injection angle by hand.

The cover 73 is a tubular portion covering the whole injection portion 71c of the injection member 71, specifically the whole injection port 71c, and is inserted into the through-hole 44 of the rear wall 42. A tip surface 73a of the tubular cover 73 is a flat surface substantially parallel to a rear surface 42a of the rear wall 42 and is positioned backward (a rear side of the vehicle 10) from the injection member 71 and positioned in a range of a thickness th of the rear wall 42.

As described above, the cover 73 can protect the injection portion 71c from outside by covering the whole injection portion 71c of the injection member 71, specifically a whole outer peripheral surface of the injection portion 71c. Further, an inner diameter d6 of the cover 73 is set larger than the movable range d5 of the injection member 71. Therefore, the cover 73 does not interfere the injection member 71 positioned in the movable range d5. An outer diameter of the cover 73 is same as the diameter d2 of the nozzle 53.

The cover 73 is formed in a true cylindrical shape concentrical with the movable center Pr of the injection member 71. Therefore, the injection member 71 and the cover 73 can be brought close to each other at the maximum without providing an unnecessary region therebetween.

The through-hole 44 of the rear wall 42 is concentrically formed with a center CL of the cover 73 (the center CL of the tip surface 73a of the cover 73). As described above, the substantially annular gap 57 is included between the through-hole 44 and the cover 73. The gap 57 can be uniformed over the whole periphery. Further, even if a mounting angle of the nozzle 53 with respect to the hood garnish 40 is different for each vehicle type, the gap 57 can be generally constant. Accordingly, an appearance around the through-hole 44 can be improved.

As illustrated in FIG. 8, the branching portion 55 is positioned on an opposite side of the mounting portion 52 with respect to the base 51. The branching portion 55 is formed in a tubular shape and communicates with the fluid passage 51a of the base 51. The branching portion 55 incorporates a valve 80. The valve 80 is a member for limiting an injection amount of a washer fluid injected from the injection port 71c. For example, the valve 80 includes a valve body 81 and a spring 82 energizing in a direction closing the valve body 81.

As described above, the washer nozzle device 50 includes the valve 80. As illustrated in FIGS. 6 and 8, the branching portion 55 and the valve 80 are positioned forward of the abutting wall 43. Therefore, in comparison with a case where the valve 80 is disposed behind the abutting wall 43, a length from the abutting wall 43 to the rear end 47 of the hood garnish 40, specifically an extension length, can be shortened. Since the extension length is short, displacement in a vertical direction of the rear end 47 of the hood garnish 40 can be suppressed.

The hose connecting portion 56 is a portion connecting to the washer fluid feeding hose 61 and linearly extends from a tip of the branching portion 55.

Figure 12:
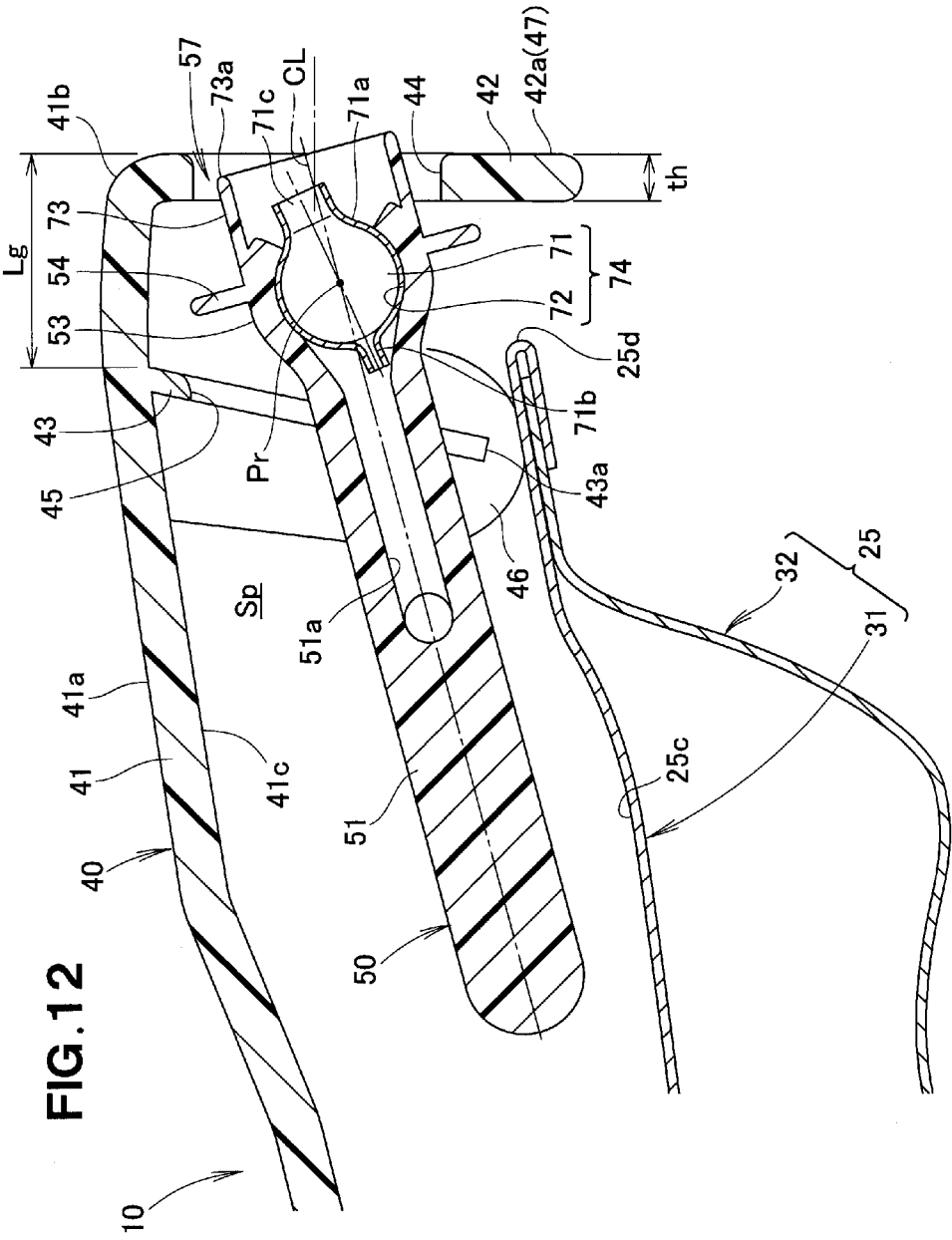
FIG. 12 is view similar to FIG. 9 but illustrating an alteration of the relation between the hood garnish and the washer nozzle device of FIG. 9.

FIG. 12 illustrates a variation of a relation between the tip surface 73a of the cover 73 and the facing wall 42. In the variation, at least a part of the tip surface 73a of the cover 73 is positioned in a range of the thickness th of the rear wall 42. Specifically, an upper half portion of the tip surface 73a is positioned in a range of the thickness th of the rear wall 42, and a lower half portion of the tip surface 73a is slightly projected backward from the rear surface 42a of the rear wall 42. More specifically, the tip surface 73a of the tubular cover 73 is a right angle to the center CL of the cover 73 and a flat surface substantially parallel to the rear surface 42a of the rear wall 42. The through-hole 44 of the rear wall 42 is concentrically formed with the center CL of the cover 73.

The above description will be summarized as below. As illustrated in FIG. 2, the washer nozzle device 50 is positioned between the upper surface 25c of the front hood 25 and the lower surface 41c of the hood garnish 40. Therefore, the washer nozzle device 50 is not visible from outside when the front hood 25 is opened. Therefore, an external appearance of the vehicle 10 can be improved. Further, it is unnecessary to dispose the washer nozzle device 50 under the front hood 25. Accordingly a height of the whole front hood 25 can be lowered.

For example, the cowl top panel 23 is positioned under a rear portion of the front hood 25. By lowering a height of the front hood 25, the front hood 25 can be brought close to an upper side of the cowl top panel 23. Since a height of the whole front hood 25 is lowered, visibility in which a driver sitting on a driver's sheet can see a vehicle front side can be expanded, and an external appearance of the vehicle 10 can be improved.

As illustrated in FIG. 4, the lower end 43a of the abutting wall 43 directly abuts on the upper surface 25c of the front hood 25 or indirectly abuts thereon via the cushion member 46. Therefore, displacement (rattling) in a vertical direction of the hood garnish 40 with respect to the front hood 25 can be controlled. Further, as illustrated in FIGS. 6 and 9, the notch 45 in which the lower end 43a is cut out is formed on the abutting wall 43. A part 51 of the washer nozzle device 50 is positioned at the notch 45. Therefore, interference by the washer nozzle device 50 with respect to the abutting wall 43 can be prevented.

Furthermore, as illustrated in FIGS. 9 and 10, a diameter of the nozzle 53 in the washer nozzle device 50 is larger than the diameter d1 of the small diameter portion 51 positioned at the notch 45. Since the injection port 71c is provided in the large diameter nozzle 53, an injection angle of the injection port 71c can be more freely set. Especially, as in the present embodiment, in the case where an injection angle of the injection port 71c can be arbitrarily adjusted in a system, the angle adjustment mechanism 74 can be provided in the nozzle 53. Further, the large diameter nozzle 53 is positioned behind the abutting wall 43. Therefore, interference in the nozzle 53 with respect to the abutting wall 43 can be prevented.

The cover 73 of the nozzle 53 covers an injection portion of the injection member 71, and therefore the cover may have a thin-walled tubular shape and is inserted into the through-hole 44 on the facing wall 42. The tip surface 73a of the tubular cover 73 is a flat surface substantially parallel to the rear surface 42a of the rear wall 42 (facing wall 42) and is positioned backward from the injection member 71. Furthermore, at least a part of the tip surface 73a of the cover 73 is positioned in a range of the thickness th of the facing wall 42 as illustrated in FIGS. 9 and 12.

Therefore, when the hood garnish 40 is seen from outside, the tip surface 73a of the cover 73 can be visually integrated with the hood garnish 40. Consequently, the hood garnish 40 and the cover 73 can have a sense of unity. Further, the cover 73 is a tubular portion. Therefore, even if inclination in a vehicle width direction and a vertical direction of the facing wall 42 of the hood garnish 40 is different for each vehicle type, displacement of the tip surface 73a with respect to the facing wall 42 is not so noticeable. Accordingly, while improving an external appearance of the vehicle 10, the washer nozzle device 50 can be commonly used in vehicles of various types. Accordingly, a cost of the vehicle 10 can be reduced.

In the present invention, the tubular cover 73 is not necessarily formed in a tubular shape. For example, the cover 73 may be formed in a tubular shape having a polygonal cross section such as a quadrilateral cross section and an octagonal cross section, and also may be formed in a tapered shape having a polygonal cross section such as a true-circle cross section and an elliptical cross section.

INDUSTRIAL APPLICABILITY

The vehicle washer nozzle device mounting structure according to the present invention is preferable for using in a configuration in which a washer fluid is sprayed on the front window panel 22 of a passenger vehicle.

REFERENCE SIGNS LIST 10 vehicle
11 vehicle body
22 front window panel (window panel)
22b panel surface
24 hinge
25 front hood
25c upper surface of front hood
25d rear end of front hood
25e one end in vehicle width direction
40 hood garnish (exterior member)
41 upper wall
41b rear end
41c lower surface
42 rear wall (facing wall)
42a rear surface
43 abutting wall
43a lower end
44 through-hole
45 notch
46 cushion member
50 washer nozzle device
51 small diameter portion (a part of washer nozzle device)
51a fluid passage
52 mounting portion
53 nozzle (rear end of washer nozzle device)
54 shielding wall
57 annular gap
61 washer fluid feeding hose
71 injection member
71a outer peripheral surface
71c injection port (injection portion)
72 injection member supporting member
73 cover
73a tip surface
74 angle adjustment mechanism
80 valve
CL center of cover
d1 diameter of small diameter portion
d2 diameter of nozzle (diameter of rear end of washer nozzle device)
d3 diameter of through-hole
d4 outer diameter of shielding wall
d5 movable range of injection member
d6 inner diameter of cover
H2 height of abutting wall
Lo moving locus of injection port
Pr movable center of injection member
Sp space (gap)
th thickness of facing wall (rear wall)

The invention claimed is:

1. A vehicle washer nozzle device mounting structure comprising a washer nozzle device configured to be mounted to a vehicle body for injecting a washer fluid to a front window panel,
wherein the vehicle body includes a front hood positioned in front of the front window panel and a hood garnish provided on the front hood,
the hood garnish extends in a vehicle-width direction along a rear end of the front hood at an interval above an upper surface of the front hood,
the washer nozzle device is positioned between the upper surface of the front hood and a lower surface of the hood garnish opposing the upper surface of the front hood,
the hood garnish includes an upper wall extending along the upper surface of the front hood with the interval and an abutting wall extending from the upper wall toward the upper surface of the front hood,
a lower end of the abutting wall is indirectly abutted to the upper surface of the front hood via a cushion member, and
the washer nozzle device vertically opposes a part of the abutting wall.

2. The vehicle washer nozzle device mounting structure according claim 1, further comprising a washer fluid feeding hose connected to the washer nozzle device, wherein
the washer fluid feeding hose extends from one end in a vehicle width direction of the front hood to outside through a gap between the front hood and the hood garnish.

3. The vehicle washer nozzle device mounting structure according to claim 2, further comprising right and left hinges configured to support both ends in a vehicle width direction of a rear end of the front hood, wherein
the washer fluid feeding hose extends from one end in a vehicle width direction of the front hood to outside along either one of the right and left hinges.

4. A vehicle washer nozzle device mounting structure comprising a washer nozzle device configured to be mounted to a vehicle body for injecting a washer fluid to a front window panel,
wherein the vehicle body includes a front hood positioned in front of the front window panel and a hood garnish provided on the front hood, the hood garnish extends in a vehicle-width direction along a rear end of the front hood at an interval above an upper surface of the front hood, the washer nozzle device is positioned between the upper surface of the front hood and a lower surface of the hood garnish, the hood garnish includes an upper wall extending along the upper surface of the front hood with the interval and an abutting wall extending from the upper wall toward the upper surface of the front hood, a lower end of the abutting wall is directly abutted to the upper surface of the front hood or indirectly abutted to the upper surface of the front hood via a cushion member, a notch in which the lower end is cut out is formed at a part of the abutting wall in a vehicle width direction, and a part of the washer nozzle device is positioned at the notch.

5. The vehicle washer nozzle device mounting structure according to claim 4, wherein the part of the washer nozzle device is formed at a small diameter portion in which a diameter is smaller than a height of the abutting wall, and the small diameter portion is positioned at the notch.

6. The vehicle washer nozzle device mounting structure according to claim 5, wherein the hood garnish includes a rear wall extending downward from a rear end of the upper wall, the rear wall extends in a vehicle width direction along the rear end of the front hood and includes a through-hole penetrating in a longitudinal direction of the vehicle body, a rear end of the washer nozzle device is inserted into the through-hole, the rear end includes a shielding wall positioned between the abutting wall and the rear wall, the shielding wall is formed in a vertical plate shape along the rear wall, and an outer diameter of the shielding wall is larger than a diameter of the through-hole.

7. The vehicle washer nozzle device mounting structure according to claim 5, wherein the washer nozzle device includes a nozzle including an injection port configured to inject the washer fluid, a diameter of the nozzle is larger than the diameter of the small diameter portion, and the nozzle is positioned behind the abutting wall.

8. The vehicle washer nozzle device mounting structure according to claim 7, wherein the hood garnish includes a rear wall extending downward from a rear end of the upper wall, the rear wall extends in a vehicle width direction along the rear end of the front hood and includes a through-hole penetrating in a longitudinal direction of the vehicle body, a rear end of the washer nozzle device is inserted into the through-hole, the rear end includes a shielding wall positioned between the abutting wall and the rear wall, the shielding wall is formed in a vertical plate shape along the rear wall, and an outer diameter of the shielding wall is larger than a diameter of the through-hole.

9. The vehicle washer nozzle device mounting structure according to claim 7, wherein the washer nozzle device includes a mounting portion configured to be mounted to the hood garnish, and the mounting portion is positioned forward of the abutting wall.

10. The vehicle washer nozzle device mounting structure according to claim 9, wherein the washer nozzle device includes a valve configured to control an injection amount of the washer fluid, and the valve is positioned forward of the abutting wall.

11. The vehicle washer nozzle device mounting structure according to claim 9, wherein the hood garnish includes a rear wall extending downward from a rear end of the upper wall, the rear wall extends in a vehicle width direction along the rear end of the front hood and includes a through-hole penetrating in a longitudinal direction of the vehicle body, a rear end of the washer nozzle device is inserted into the through-hole, the rear end includes a shielding wall positioned between the abutting wall and the rear wall, the shielding wall is formed in a vertical plate shape along the rear wall, and an outer diameter of the shielding wall is larger than a diameter of the through-hole.

12. The vehicle washer nozzle device mounting structure according to claim 7, wherein the washer nozzle device includes a valve configured to control an injection amount of the washer fluid, and the valve is positioned forward of the abutting wall.

13. The vehicle washer nozzle device mounting structure according to claim 12, wherein the hood garnish includes a rear wall extending downward from a rear end of the upper wall, the rear wall extends in a vehicle width direction along the rear end of the front hood and includes a through-hole penetrating in a longitudinal direction of the vehicle body, a rear end of the washer nozzle device is inserted into the through-hole, the rear end includes a shielding wall positioned between the abutting wall and the rear wall, the shielding wall is formed in a vertical plate shape along the rear wall, and an outer diameter of the shielding wall is larger than a diameter of the through-hole.

14. The vehicle washer nozzle device mounting structure according to claim 4, wherein the hood garnish includes a rear wall extending downward from a rear end of the upper wall, the rear wall extends in a vehicle width direction along the rear end of the front hood and includes a through-hole penetrating in a longitudinal direction of the vehicle body, a rear end of the washer nozzle device is inserted into the through-hole, the rear end includes a shielding wall positioned between the abutting wall and the rear wall, the shielding wall is formed in a vertical plate shape along the rear wall, and an outer diameter of the shielding wall is larger than a diameter of the through-hole.

15. The vehicle washer nozzle device mounting structure according to claim 14, wherein the rear wall of the hood garnish is positioned right behind the rear end of the front hood, and the shielding wall is positioned between the rear wall of the hood garnish and the rear end of the front hood.

16. A vehicle washer nozzle device mounting structure comprising a washer nozzle device configured to inject a washer fluid to a window panel is positioned on an inner side of an exterior member of a vehicle body and mounted to vehicle body, wherein the exterior member includes a facing wall facing to a panel surface of the window panel, a through-hole directing the panel surface is formed on the facing wall, the washer nozzle device includes a nozzle directing the panel surface, the nozzle includes an injection member configured to inject the washer fluid, an injection member supporting member configured to support an outer peripheral surface of the injection member such that an injection angle of the injection member can be adjusted, and a cover extending toward the panel surface from the injection member supporting member, the cover is a tubular portion covering an injection portion of the injection member and inserted into the through-hole of the facing wall, and a tip surface of the tubular cover is a flat surface substantially parallel to a rear surface of the facing wall and is positioned behind the injection member, and at least a part of the tip surface is positioned in a range of a thickness of the facing wall.

17. The vehicle washer nozzle device mounting structure according to claim 16, wherein the cover covers the whole of an injection portion of the injection member, and an inner diameter of the cover is set larger than a movable range of the injection member.

18. The vehicle washer nozzle device mounting structure according to claim 17, wherein a movable range of the injection member is set in a range in which a moving locus of the injection portion becomes an arc shape, based on a movable center of the injection member with respect to the injection member supporting member, and the cover is formed in a true cylindrical shape concentrical with the movable center of the injection member.

19. The vehicle washer nozzle device mounting structure according to claim 18, wherein the through-hole of the facing wall is concentrically formed with respect to a center of the cover.

* * * * *